May 1, 1951 H. K. FLINCHBAUGH 2,551,368
VEHICLE UNLOADING MECHANISM
Filed Aug. 30, 1949 2 Sheets-Sheet 1
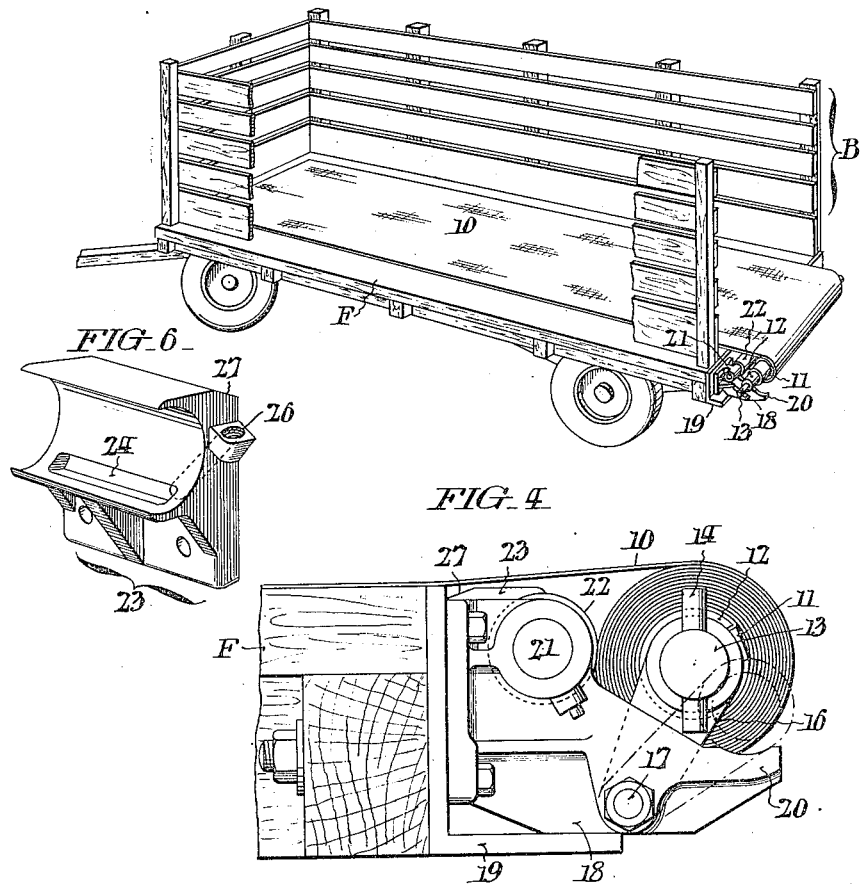
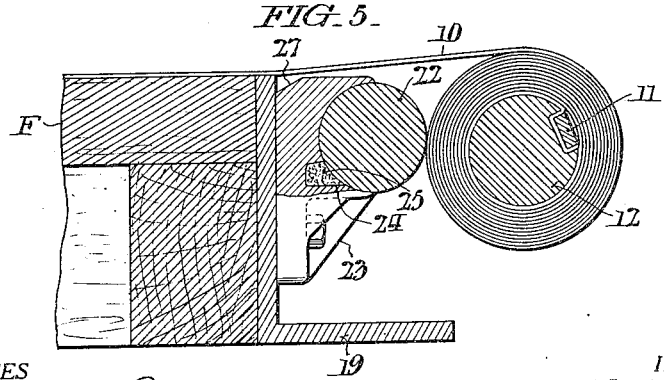
INVENTOR:
Henry K. Flinchbaugh
BY Paul & Paul
ATTORNEYS.

May 1, 1951 H. K. FLINCHBAUGH 2,551,368
VEHICLE UNLOADING MECHANISM
Filed Aug. 30, 1949 2 Sheets-Sheet 2
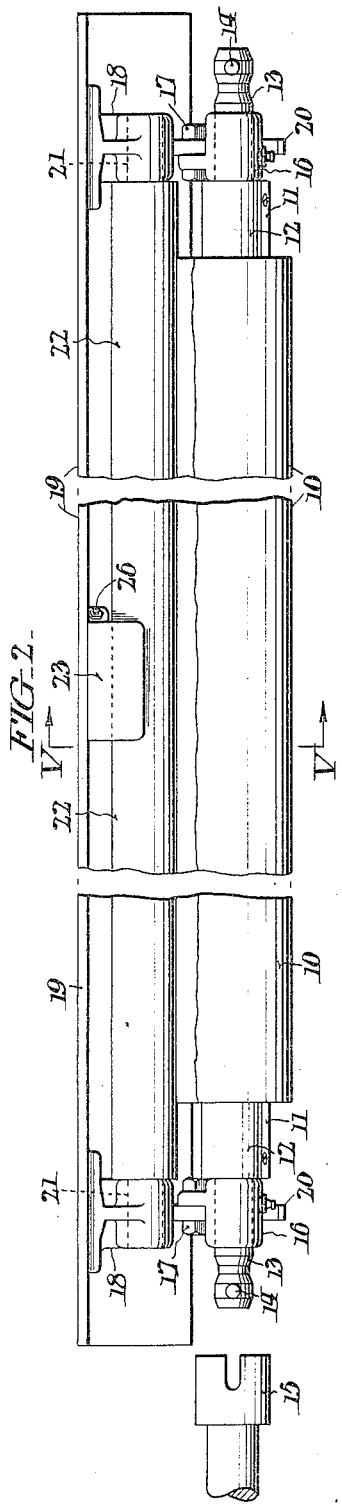
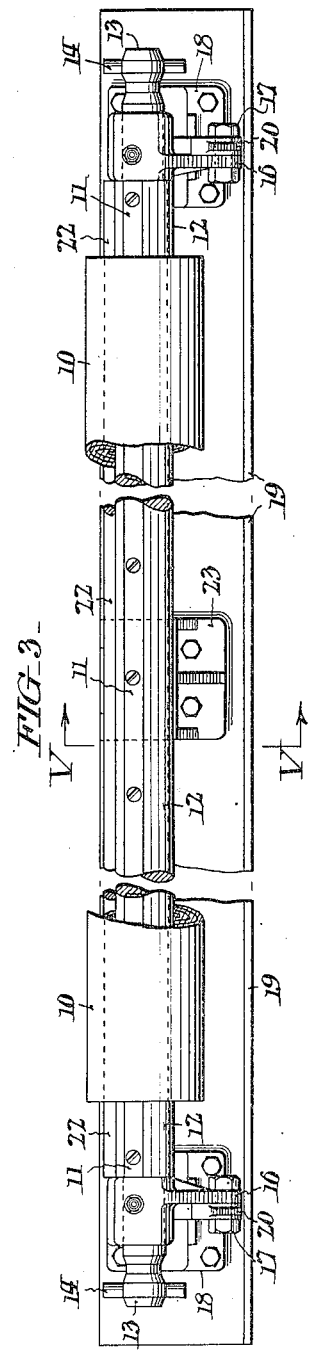
INVENTOR:
Henry K. Flinchbaugh
BY Paul & Paul
ATTORNEYS.

Patented May 1, 1951

2,551,368

UNITED STATES PATENT OFFICE 2,551,368

VEHICLE UNLOADING MECHANISM

Henry K. Flinchbaugh, York, Pa.

Application August 30, 1949, Serial No. 113,049

6 Claims. (Cl. 214—83.34)

This invention relates to vehicle unloading mechanisms. More specifically, it is concerned with unloading mechanisms of a type intended for use, for example, on farm vehicles and the like employed in transportation of materials, such as ensilage, whole corn, baled hay etc., wherein the materials are supported upon a flexible drag apron of canvas or the like overlaid upon the floor of the vehicle preparatory to loading, and wherein unloading is effected by winding the apron on a take-up roll operated either manually or by power. For ease of operation, the take-up roll is ordinarily made to a small diameter, and since its length must be substantially equal to the width of the apron (and of the vehicle body), it tends to spring or bow, as the apron is taken up with the weight of the material upon it. The belt is thereby unequally strained and distorted incident to the discharge of heavy loads from the vehicle, as a consequence of which it is permanently injured in a short time and hence must be frequently replaced at considerable expense.

My invention is directed in the main toward overcoming the above mentioned drawbacks. This objective is realized, as hereinafter more fully disclosed, through incorporation in an unloading mechanism of the kind referred to, of means whereby the take-up roll is effectively buttressed against springing or bending, so that the apron is smoothly and evenly wound on the roll, and the strains to which it is subjected are uniformly distributed across the width thereof.

Other objects and attendant advantages will appear from the following detailed description of the attached drawings, wherein, Fig. 1 is a perspective view of a vehicle in the form of a horse drawn wagon with an unloading mechanism conveniently embodying my invention, the near side of the wagon body having been broken away to expose the drag apron.

Fig. 2 is a broken out view showing the mechanism in top plan.

Fig. 3 shows the mechanism in rear elevation with portions broken away to expose important parts which would otherwise be hidden.

Fig. 4 shows the mechanism in end elevation.

Fig. 5 is a cross section taken as indicated by the angled arrows V—V in Figs. 2 and 3; and Fig. 6 is a perspective view of one of the component parts of the mechanism.

Referring more specifically now to these drawings, 10 designates the drag apron of my improved unloading mechanism, whereof one end is secured, by an inset clamp bar 11 (Figs. 3, 4 and 5), to a take-up roll 12 at the rear or unloading end of the body B of the vehicle. In preparation for loading, the apron 10 is drawn forwardly over the floor F of the vehicle body B as shown in Fig. 1, and in unloading, it is wound upon the take-up roll 12 whereof the end trunnions 13 are extended and provided with transverse key pins 14 for connection of an operating crank handle such as partly shown at 15 in Fig. 2, or for connection of a suitable power drive unit in a manner well known to users of unloading apparatus of this type.

In accordance with my invention, the trunnions 13 of the take-up roll 12 are journalled in the free ends of a pair of vertically-arranged arms 16 which, at their bottom ends, are fulcrumed for pivotal movement about studs 17 in laterally spaced brackets 18 bolted fast to a crosswise angle bar 19 at the rear edge of the floor F of the vehicle body B as shown in Figs. 2-4. Rearward stop projections 20 are provided on the brackets 18 to limit the fall of the arms as shown in broken lines in Fig. 4.

With its end trunnions 21 journalled in the brackets 18 forwardly of the take-up roll 12 above the fulcra 17 for the arms 16 and with its top somewhat below the level of the vehicle floor F, is a buttressing roller 22 which is coextensive in length with said take-up roll. Midway of its length, the buttressing roller 22 is backed, as shown in Figs. 2, 3 and 5, by a bearing 23 secured by bolts to the angle bar 19 which serves the brackets 18. From Figs. 5 and 6 it will be noted that the bearing 23 has a longitudinal recess 24 for retention of a wiping pad 25 of felt or the like which is maintained moist with lubricating oil introduced through a duct 26. It will moreover be noted from Figs. 4 and 5 that the top of the bearing 23 is flat and beveled off at the front as at 27 to ease rearward travel of the apron 10 over it.

Operation

Let it be assumed that the vehicle is loaded and about to be emptied. As the roll 12 is turned clockwise in Fig. 1 to take-up the apron 10, it is held to the buttressing roll 22 through the drag induced in said apron by the weight of the material supported thereon. As the operation continues with accumulation of the apron on the roll 12, the latter will gradually recede by virtue of being supported by the arms 16, but at the same time it will be restrained against springing or bowing through constant tangential contact of the growing coil of the apron thereon with the buttressing roll 22 which will be braced, in turn, against springing or bending by reason of being backed at the center by the bearing 23. Accordingly through my invention, the strains to which the apron is subjected by the weight of the material during unloading will be uniformly distributed throughout the width thereof. Uneven winding of the apron with attendant distortion or creasing will thus be effectively avoided and the useful life thereof correspondingly prolonged. Upon complete collection of the apron upon the take-up roll 12, the latter will fall away from the buttressing roller 20 by gravity until stopped by encounter of the bearing bosses of the arms 16 with the projections 20 of the brackets 18 as indicated in broken lines in Fig. 4.

Having thus described my invention, I claim:

1. In vehicle unloading mechanism, a flexible load supporting apron overlaid upon the floor of the vehicle; a take-up roll for the apron; a fixedly-supported coextensive auxiliary roller in parallel relation to the take-up roll for buttressing the latter against springing or bowing as the apron is wound under load; and means for rotatively supporting the take-up roll with capacity to move toward or away from the buttressing roller as and for the purpose set forth.

2. Vehicle unloading mechanism according to claim 1, wherein the buttressing roller is journalled in fixed bearings; and wherein the take-up roll is journalled in the free ends of a pair of arms for movement toward or away from the buttressing roller.

3. In vehicle unloading mechanism, a flexible load supporting apron overlaid upon the floor of the vehicle body; a pair of laterally spaced brackets affixed to the rear end of the vehicle body; a take-up roll for the apron; a buttressing roller disposed in advance of the take-up roll and journalled at opposite ends in the brackets; and means whereby the take-up roll is rotatively supported between the brackets with capacity to move toward or away from the buttressing roller as and for the purpose set forth.

4. Vehicle unloading mechanism according to claim 3, wherein the take-up roll is journalled at opposite ends in the free ends of a pair of arms fulcrumed on the brackets for movement of said roll toward and away from the buttressing roller.

5. Vehicle unloading mechanism according to claim 3, wherein the take-up roll is journalled at opposite ends in the free ends of a pair of arms fulcrumed on the brackets for movement of said roll toward and away from the buttressing roller; and further including stops on the brackets for limiting movement of the take-up roll away from the buttressing roller.

6. Vehicle unloading mechanism according to claim 3, further including a rearwardly open bearing for the buttressing roller, affixed to the rear end of the vehicle body intermediate the brackets.

HENRY K. FLINCHBAUGH.

REFERENCES CITED

The following references are of record in the file of this patent:

UNITED STATES PATENTS

| Number | Name | Date |
| --- | --- | --- |
| 2,079,790 | Colorigh | May 11, 1937 |
| 2,091,789 | Maussnest | Aug. 31, 1937 |
| 2,355,226 | Mallory | Aug. 8, 1944 |
| 2,448,122 | Recker | Aug. 31, 1948 |
| 2,468,925 | DeBoer | May 3, 1949 |